3,096,240
PROCESS FOR THE CONTROL OF BLOAT IN RUMINANTS WITH TRIS(HYDROXYMETHYL)AMINOMETHANE

Louis L. Rusoff, Baton Rouge, La., assignor to Commercial Solvents Corporation, New York, N.Y., a corporation of Maryland
No Drawing. Filed Feb. 20, 1961, Ser. No. 90,213
6 Claims. (Cl. 167—53)

My invention relates to the treatment of bloat in ruminating animals. More particularly my invention relates to the control and reduction of bloat in ruminating animals by the administration of tris(hydroxymethyl)aminomethane.

Bloat, a major digestive disorder of ruminating animals such as cattle and sheep is the distention of the stomach with gas. This swelling results in great discomfort to the animal adversely affecting meat and milk production in the otherwise healthy animal and often resulting in death. Great amounts of gas are normally produced in rumen mainly because of fermentation of ingested forage caused by the activity of microorganisms found in the rumen. This gas is normally eliminated by combinations of absorption, eructation, and passage through and out the lower portions of the gut. However, under certain feeding conditions, excessive accumulation of gas occurs. The build up of excessive gas seems to have an inhibitory effect on eructation which becomes less efficient as distention progresses thus worsening the already aggravated condition.

Since man's domestication of ruminating animals, there have been multitudes of methods proposed for reducing and controlling bloat. Early Roman records show that bloat was treated in cattle by the use of vinegar. More recently oral doses of vegetable oils have been utilized with some success. Also, such widely varying compositions as acetyltributyl citrate and pencillin have been administered to the animal either orally or by direct injection into the rumen. However, previous processes have not proved to be entirely satisfactory in all instances. For example, some bloat-controlling compositions, while immediately effective in reducing bloat during initial treatments lose their effectiveness when administered to the same animal over long periods of time. Other compounds produce adverse side effects on the animal when administered in amounts necessary to control bloat, while yet other compositions even though effective in varying degrees, are expensive and impractical to use.

I have now discovered a new process for controlling and reducing bloat in ruminating animals. My process is both economical and effective and can be satisfactorily used in repeated treatments over long periods of time. Further, my process is safe in that it causes no adverse effects on the animals treated and does not interfere with normal growth and activity.

My process consists essentially of administering to the ruminant animal bloat-reducing amounts of tris(hydroxymethyl)aminomethane, a compound described in U.S. Patent No. 2,559,440 and Proceedings of the Society for Experimental Biology and Medicine, vol. 62, pp. 33-34 (1946). Generally I have found that I can satisfactorily control and reduce bloat by administering to the animal daily amounts of from about 0.01 to about 1 pound of tris(hydroxymethyl)aminomethane per 1,000 pounds of animal body weight. For maximum results, I prefer to utilize from about 0.1 to about 0.5 pound of tris(hydroxymethyl)aminomethane per 1,000 pounds of animal body weight.

My bloat-reducing agent can be administered to the animal in any convenient manner. For example, I can incorporate the agent in a nutrient feed for oral consumption by the animal; or I can form aqueous solutions of the agent for consumption by the animal as drinking water. Also I can directly inject tris(hydroxymethyl)aminomethane or aqueous solutions thereof into the rumen or force feed the substance through a stomach tube. The administration of tris(hydroxymethyl)aminomethane, according to my process, not only combats the increase of gas production in the bloated animal but actually eliminates large amounts of accumulated gas found in the bloated animal.

The following examples are given to illustrate my invention; but it is not intended that my invention be limited to the procedures, amounts, or means of administration shown; but rather it is intended that all equivalents obvious to those skilled in the art be included within the scope of my invention.

Example I

A 600-pound heifer suffering from chronic bloat consumed daily in a grain ration for a period of twelve days approximately 0.3 pound of tris(hydroxymethyl)aminomethane. At the end of the first day of feeding, some relief from bloat was noted. At the end of the fifth day of feeding, the bloat was greatly reduced. At the end of the twelve-day test, all signs of bloat in the animal had disappeared.

Example II 0.5 pound of tris(hydroxymethyl)aminomethane dissolved in one quart of water was injected intra rumenily into a 1200 pound milk-producing cow suffering from acute bloat by means of a series of five injections given at hourly intervals. The injections were made into the rumen on the left side of the animal by means of a hypodermic needle passing in sequence through the following musculature: the left fascialata, the left external oblique abdominus, the left internal oblique abdominus, and the rumen muscles. At the completion of the injection series, the animal showed a marked reduction in bloat.

Example III

A 650-pound heifer suffering from sub-acute bloat, consumed approximately 0.2 pounds of tris(hydroxymethyl)aminomethane daily for a period of twenty days, the tris(hydroxymethyl)aminomethane having been dissolved in the animal's drinking water. At the end of the first day of treatment, the animal showed some signs of bloat reduction. At the end of ten days of treatment, the animal demonstrated a great reduction in bloat. At the completion of the test, all signs of bloat had disappeared.

Now having described my invention, what I claim is:
1. A process for the treatment of bloat in ruminant animals which comprises administering to the bloated animal bloat-reducing amounts of tris(hydroxymethyl)aminomethane.

2. A process for the reduction and control of bloat in ruminant animals which comprises administering to the bloated animal from about 0.01 to about 1 pound of tris(hydroxymethyl)aminomethane per 1,000 pounds of animal body weight.

3. The process of claim 2 wherein the amount of tris(hydroxymethyl)aminomethane administered is from about 0.1 to about 0.5 pound per 1,000 pounds of animal body weight.

4. The process of claim 2 wherein the tris(hydroxymethyl)aminomethane is administered in the form of an aqueous solution.

5. The process of claim 2 wherein the tris(hydroxymethyl)aminomethane is administered in combination with a nutrient feed.

6. The process of claim 2 wherein the tris(hydroxymethyl)aminomethane is injected directly into the rumen.

References Cited in the file of this patent

Nahas: Chem. Abst., vol. 53, 1959, page 13386d.